(No Model.)
H. SCHMIDT.
Engraver's Vise.
No. 240,852.
Patented May 3, 1881.
Fig I.
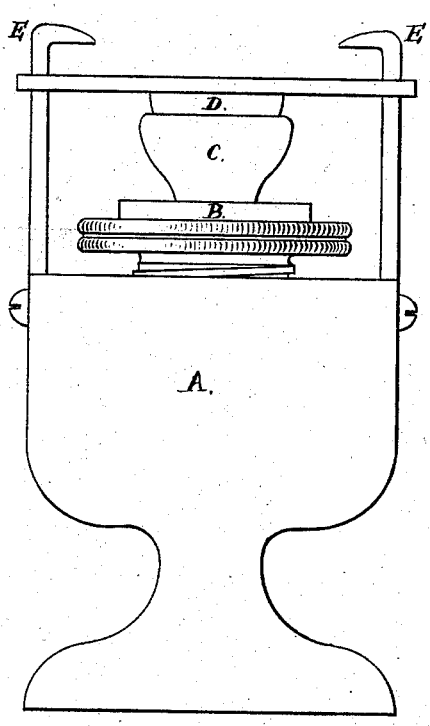
Fig II.
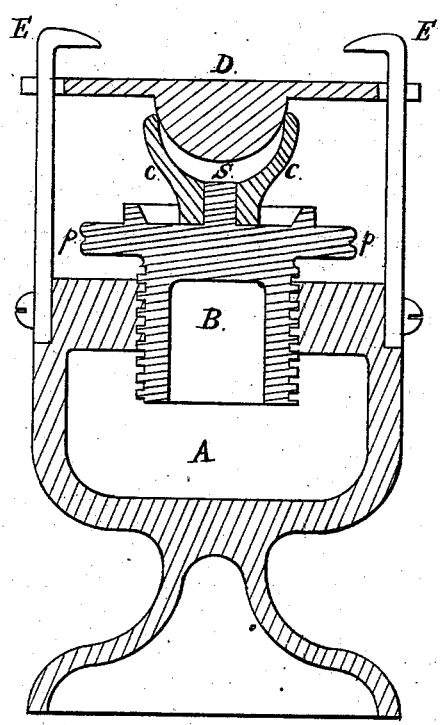
Witnesses;
Hermann Hanstein
Robert Earl
Inventor;
Hugo Schmidt

UNITED STATES PATENT OFFICE.

HUGO SCHMIDT, OF CHICAGO, ILLINOIS.

ENGRAVER'S VISE.

SPECIFICATION forming part of Letters Patent No. 240,852, dated May 3, 1881.

Application filed July 15, 1880. (No model.)

*To all whom it may concern:*

Be it known that I, HUGO SCHMIDT, of Chicago, Illinois, have invented an Improvement in Engravers' Vises, of which the following is a specification.

My invention relates to a vise which is readily adjusted to hold different-shaped articles; and it consists in the combination of a table capable of a universal movement upon its hemispherical seat, and two or more clamping-arms, with an adjustable screw, and a washer pivoted thereon on its lower portion, and socketed on its upper portion to fit the hemispherical seat of the table.

When the article to be held is placed between the above-mentioned clamps and table said table can be adjusted to clamp it by means of the screw, the lower surface of the washer making a bearing for the screw, while the socket in its upper part allows the table to adjust itself to the angle required by the said article when its upper surface is held level by the clamping-arms.

In the drawings herein referred to and forming a part of this specification, Figure I is a side view, and Fig. II a sectional view, of the vise.

A represents the body of the vise, which is provided with an inside screw-thread on its upper portion. The screw B fits this thread and is provided with a knurled rim, at $p$ $p$, with which to easily adjust it by hand. It is also provided with a projection or pin, at S, which forms a pivot for the washer C. This washer is socketed on its upper surface, where it forms a universal joint with the hemispherical seat of the table D. The clamping-arms E E are in the shape of right angles, and are rigidly attached to the body A by means of screws.

When the vise is used the article to be held is placed under the clamping-arms E E on the table D. Then the screw B is raised, raising the table and article at the same time, until the latter comes in contact with the clamping-arms, which will hold its upper surface level, while the table, resting on a universal joint, adjusts itself to the lower one, and, sufficient force being applied, the article is held firmly between the table and the clamping-arms.

If the washer C should be left out and the screw B provided with a socket, it would require more power to operate the vise, or, with the same power applied to the screw, an article could not be held as tight, because there would be more friction between the table D and the socket of the screw than there is between the washer C and the screw, the bearing-surface on the former being on a larger diameter on the socket than on its lower surface. The friction would also be multiplied, because the hemispherical seat of the table will act as a wedge when pressed in its socket, the bearing-surface between those two parts not being in a right angle to the line in which they are pressed together.

This vise is applicable to all purposes where it is desirable to hold articles firmly and so that their upper surface is level; but it is principally designed for engravers' use.

What I claim as my invention, and desire to secure by Letters Patent, is—

In an engraver's vise, the combination of the screw B, socket C, pivoted thereon, and the table D, provided with a hemispherical seat, with the clamping-arms E E, constructed as set forth, and for the purpose specified.

HUGO SCHMIDT.

Witnesses:
HERMANN HANSTEIN,
ROBERT CARL.